United States Patent [19]
Hemmelgarn et al.

[11] Patent Number: 6,058,618
[45] Date of Patent: May 9, 2000

[54] COORDINATE MEASURING MACHINE

[75] Inventors: Thomas L. Hemmelgarn, Vandalia; Frederick K. Bell; Freddie L. Raleigh, both of Centerville; Donald K. Greier, Dayton, all of Ohio

[73] Assignee: Giddings & Lewis, Inc.

[21] Appl. No.: 08/926,161

[22] Filed: Sep. 9, 1997

[51] Int. Cl.[7] .................................................. G01B 5/03
[52] U.S. Cl. .................................................... 33/503
[58] Field of Search .......................... 33/503, 1 M, 504, 33/556

[56] References Cited

U.S. PATENT DOCUMENTS

| | | | |
|---|---|---|---|
| 4,207,680 | 6/1980 | Bell et al. | 33/174 R |
| 4,507,868 | 4/1985 | Tuss | 33/1 M |
| 4,594,791 | 6/1986 | Brandstetter | 33/503 |
| 4,597,182 | 7/1986 | Rinn | 33/1 M |
| 4,610,089 | 9/1986 | Bell et al. | 33/1 M |
| 4,630,374 | 12/1986 | Raleigh | 33/1 M |
| 4,680,868 | 7/1987 | Orr et al. | 33/503 |
| 4,682,418 | 7/1987 | Tuss et al. | 33/1 M |

(List continued on next page.)

FOREIGN PATENT DOCUMENTS

| | | |
|---|---|---|
| 0523023 A1 | 1/1993 | European Pat. Off. . |
| 0564152 A2 | 10/1993 | European Pat. Off. . |
| 0629833 A3 | 12/1994 | European Pat. Off. . |
| 3410672 A1 | 10/1985 | Germany . |
| 3506917 A1 | 8/1986 | Germany . |
| 56-104210 | 8/1981 | Japan ......................................... 33/503 |
| 05329728 | 12/1993 | Japan . |
| 08043008 | 2/1996 | Japan . |
| 2163255 | 2/1986 | United Kingdom ...................... 33/503 |
| WO 97/43595 | 11/1997 | WIPO . |

OTHER PUBLICATIONS

Giddings & Lewis, Inc., Sales Brochure for *Cordax MeasureMax*, 1997, 2 pgs.
International Metrology Systems, Sales Brochure for *Impact CMM* (no date available), 6 pgs.

(List continued on next page.)

*Primary Examiner*—G. Bradley Bennett
*Attorney, Agent, or Firm*—Foley & Lardner

[57] ABSTRACT

A coordinate measuring machine (CMM) is disclosed having improved manufacturability and low cost while maintaining high performance standards. The CMM includes a polymer composite gantry-style base incorporating a three-point support configuration in the X, Y, and Z axes. The X-beam is hollow, has a horizontal cross-sectional orientation, uses a passive ventilation technique, and is attached to the bearing at one end by a compliant mount. The Z-axis probe shaft incorporates a combined counterbalance/drive assembly and a compliant secondary rail guide mechanism. The X-axis and Y-axis drive screws have angular alignment capability using a spherical washer configuration. This combination of features serves to minimize non-repeatable errors and enhance the manufacturability of the CMM, providing substantial improvements in CMM design and construction.

21 Claims, 12 Drawing Sheets

U.S. PATENT DOCUMENTS

| | | | |
|---|---|---|---|
| 4,696,839 | 9/1987 | Renker et al. | 428/15 |
| 4,727,653 | 3/1988 | Fujitani et al. | 33/503 |
| 4,799,316 | 1/1989 | Tuss | 33/503 |
| 4,819,195 | 4/1989 | Bell et al. | 364/571.05 |
| 4,882,848 | 11/1989 | Breyer et al. | 33/559 |
| 4,887,360 | 12/1989 | Hemmelgarn et al. | 33/503 |
| 4,928,396 | 5/1990 | Raleigh | 33/503 |
| 4,945,501 | 7/1990 | Bell et al. | 364/571.05 |
| 4,964,220 | 10/1990 | Orr et al. | 33/503 |
| 5,063,683 | 11/1991 | Bury | 33/573 |
| 5,072,522 | 12/1991 | Stott et al. | 33/503 |
| 5,125,163 | 6/1992 | Bury | 33/573 |
| 5,173,613 | 12/1992 | Henry et al. | 250/560 |
| 5,189,805 | 3/1993 | Matsumoto et al. | 33/503 |
| 5,257,461 | 11/1993 | Raleigh et al. | 33/503 |
| 5,287,629 | 2/1994 | Pettersson | 33/503 |
| 5,339,531 | 8/1994 | Ogiwara | 33/503 |
| 5,341,574 | 8/1994 | Bieg | 33/502 |
| 5,402,981 | 4/1995 | McMurty | 248/638 |
| 5,471,406 | 11/1995 | Breyer et al. | 364/559 |
| 5,505,004 | 4/1996 | Pettersson | 33/503 |
| 5,526,576 | 6/1996 | Fuchs et al. | 33/503 |
| 5,621,978 | 4/1997 | Sarauer | 33/503 |

OTHER PUBLICATIONS

Prescision Polymer Castings, Inc. Sales Brochure for *Zanite (TM) Polymer Composite* (no date available), 4 pgs.

Slocum, A.H., *Precision Machine Design*, Prentice Hall, N.J., 1992, pp. 45–57 and pp. 316–318.

Giddings & Lewis, Inc., Sales Brochure for *Cordax, Coordinate Measuring Machines* 1994, 6 pgs.

Giddings & Lewis, Inc., Sales Brochure for *R–Series, Cordax Coordinate Measuring Machines*, 1995, 6 pgs.

Mitutoyo, Sales Brochure (Bulletin No. 4430) for various Coordinate Measuring Machines (no date available), 8 pgs.

Helmel, Advertisement for *Checkpack*, 1997, 2 pgs.

Helmel, Sales Brochure for *Microstar L Series DCC CMM* (no date available), 2 pgs.

Helmel, Sales Brochure for *PcMM*, 1993, 8 pgs.

D.E.A., Sales Brochure for *Scirocco CMM*, Mar. 1994, 6 pgs.

D.E.A., Sales Brochure for *MISTRAL Coordinate Measuring Machine* (no date available), p. K–23.

D.E.A., Sales Brochure for *Swift CMM*, Mar. 1994, 6 pgs.

Carl Zeiss, Inc., Sales Brochure for *Zeiss Eclipse Series*, Apr. 1, 1993, 2 pgs.

Mitutoyo, Catalog No. US4135, *BRT Series 191, CNC Coordinate Measuring Machines* (no date available), 6 pgs.

Starrett, Bulletin No. *733 RGDC High Performance CMMs*, Aug. 1994, 4 pgs.

Mitutoyo, Catalog No. US 4118 (2), Sales Brochure for *CNC Coordinate Measuring Machine FHN906 Series 322* (no date available), 4 pgs.

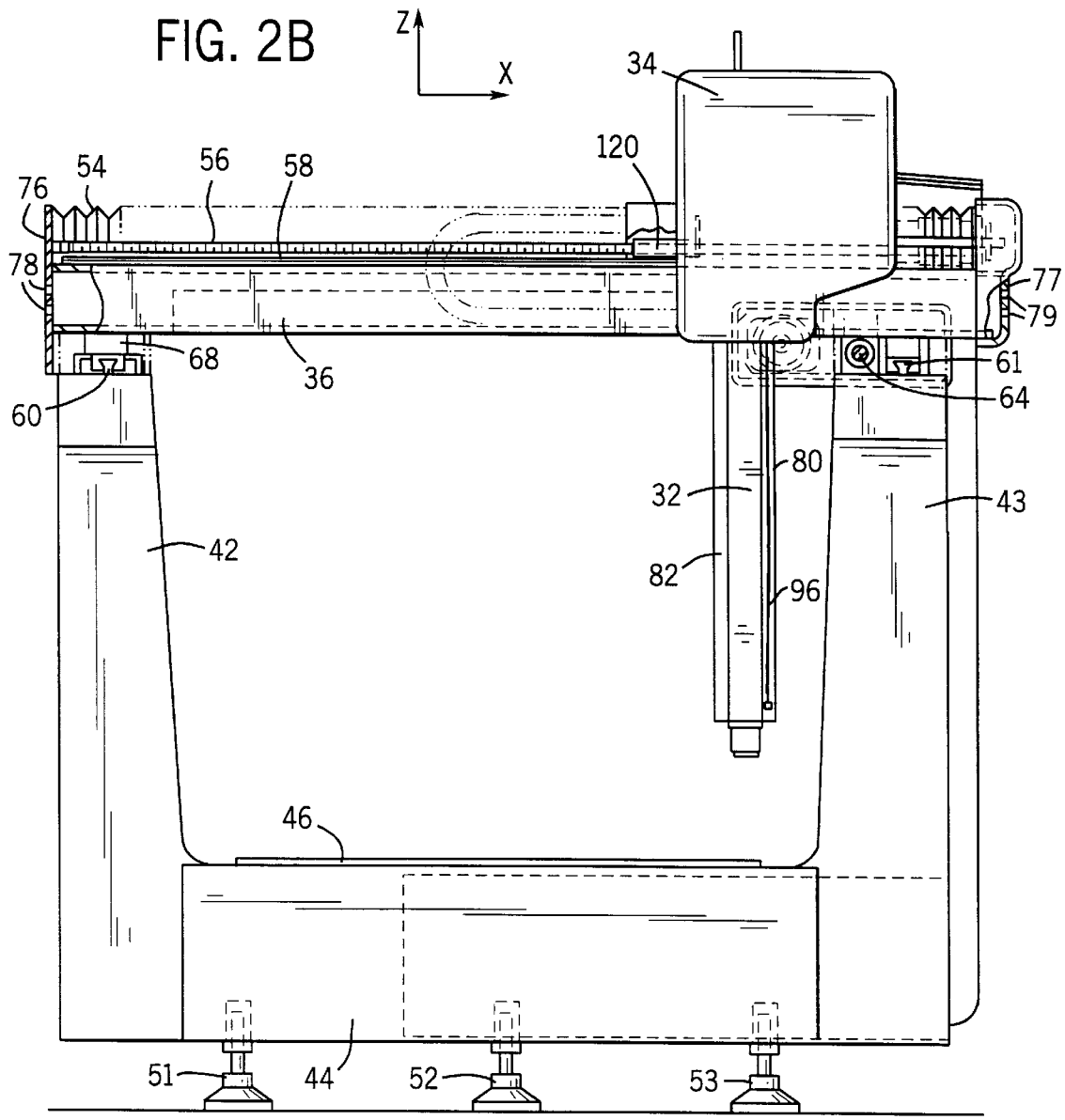

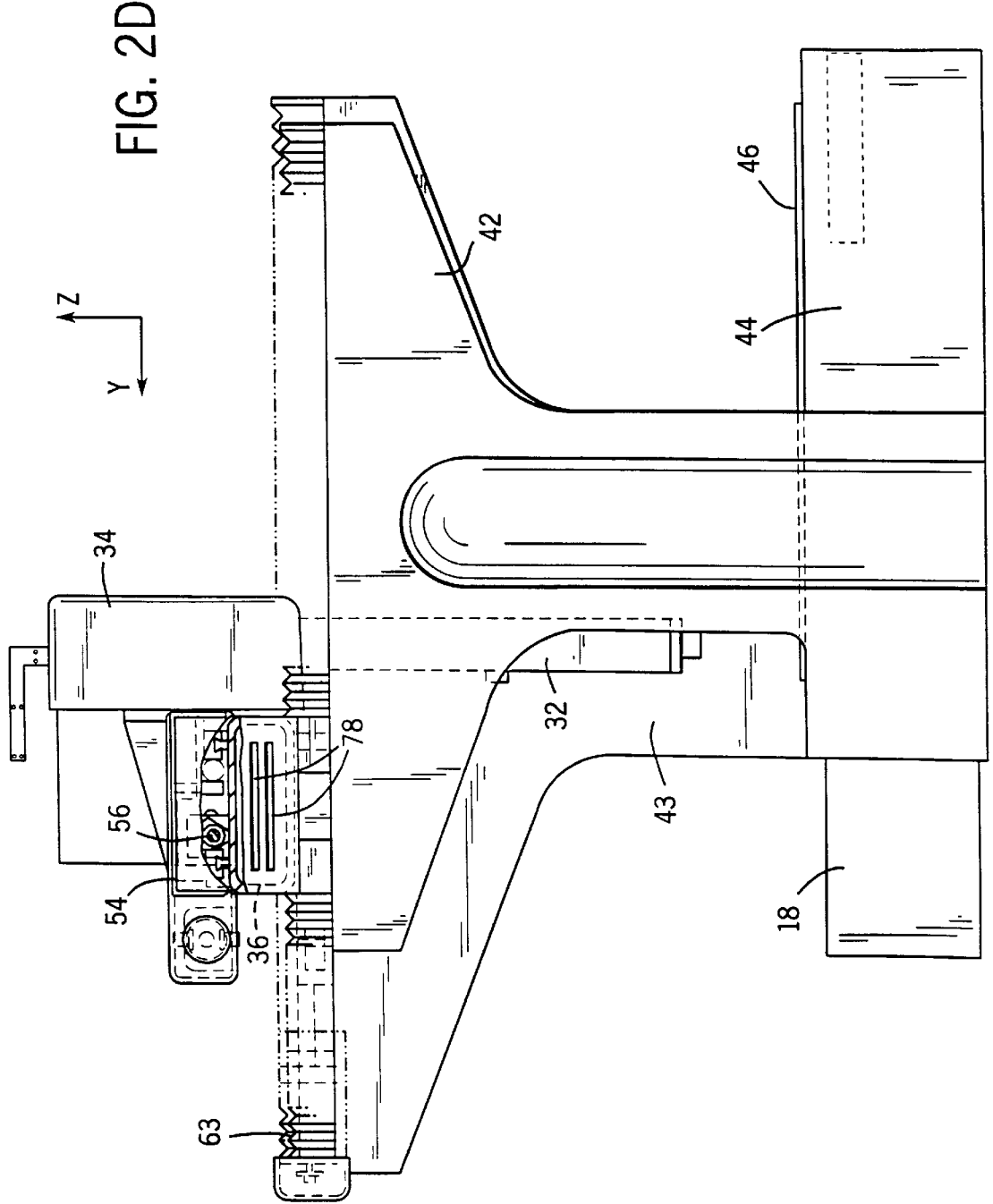

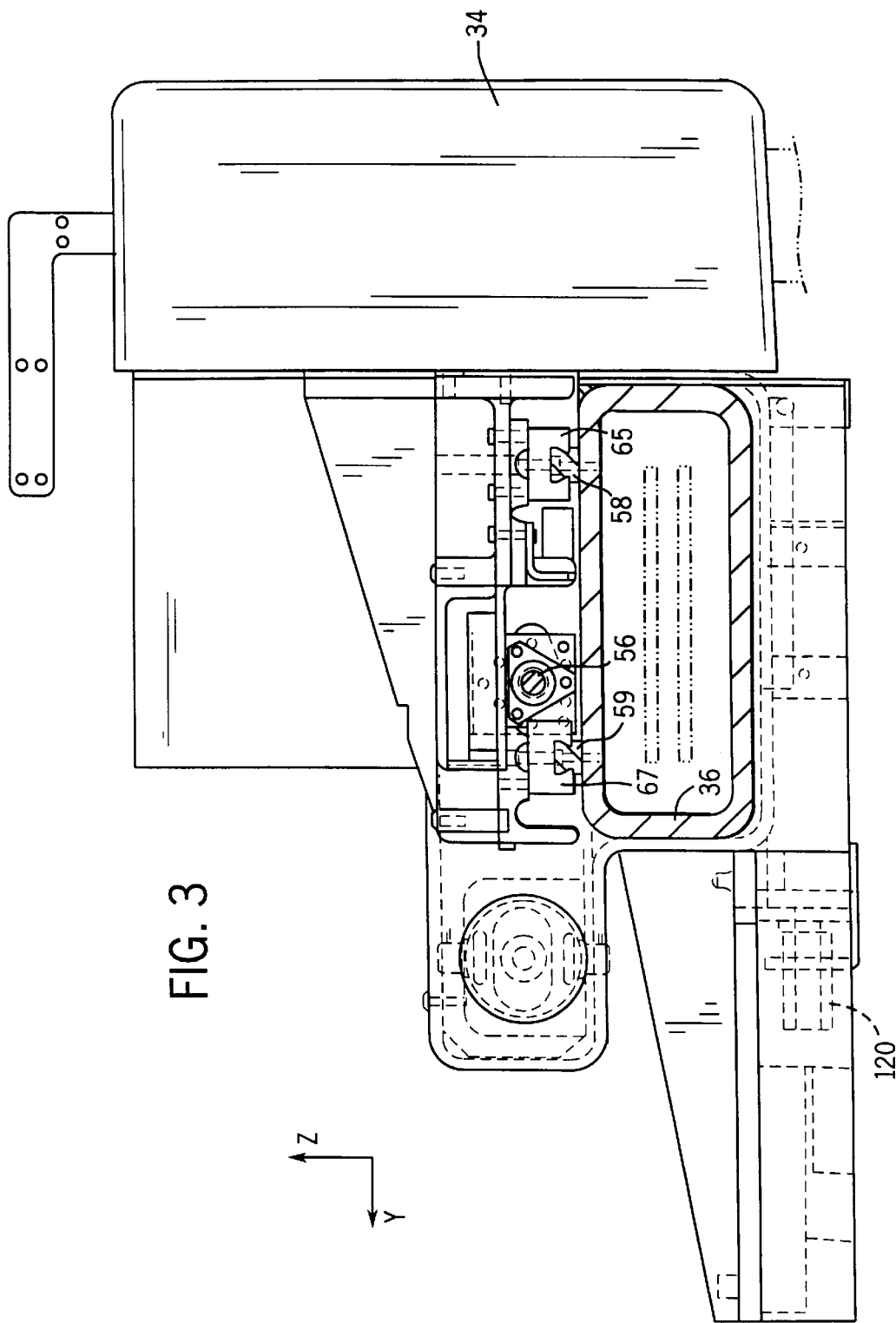

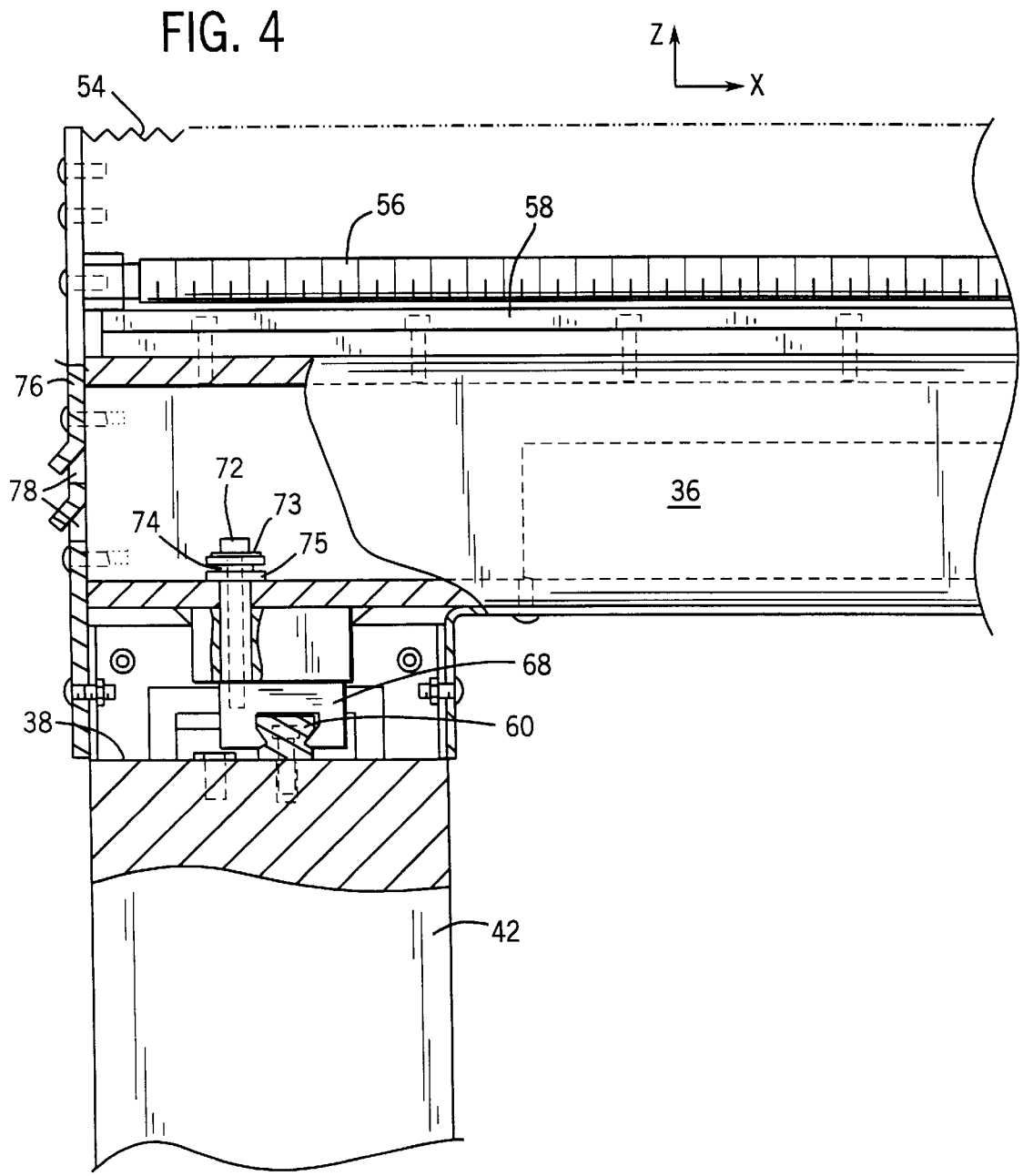

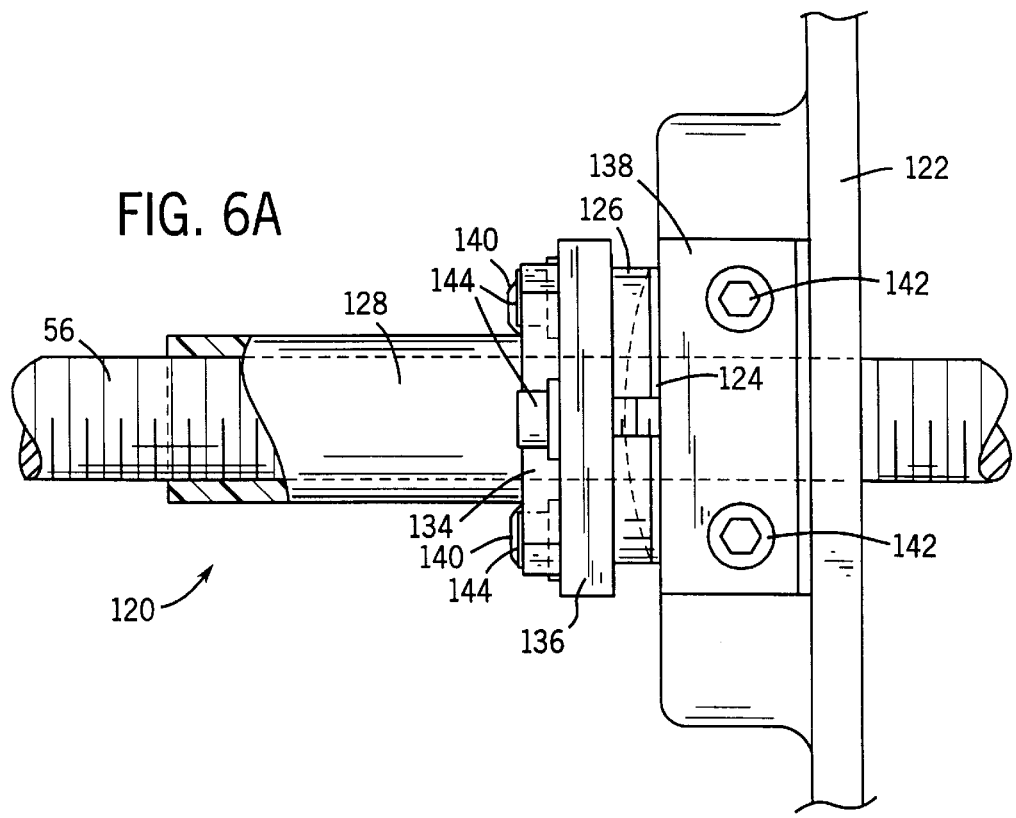
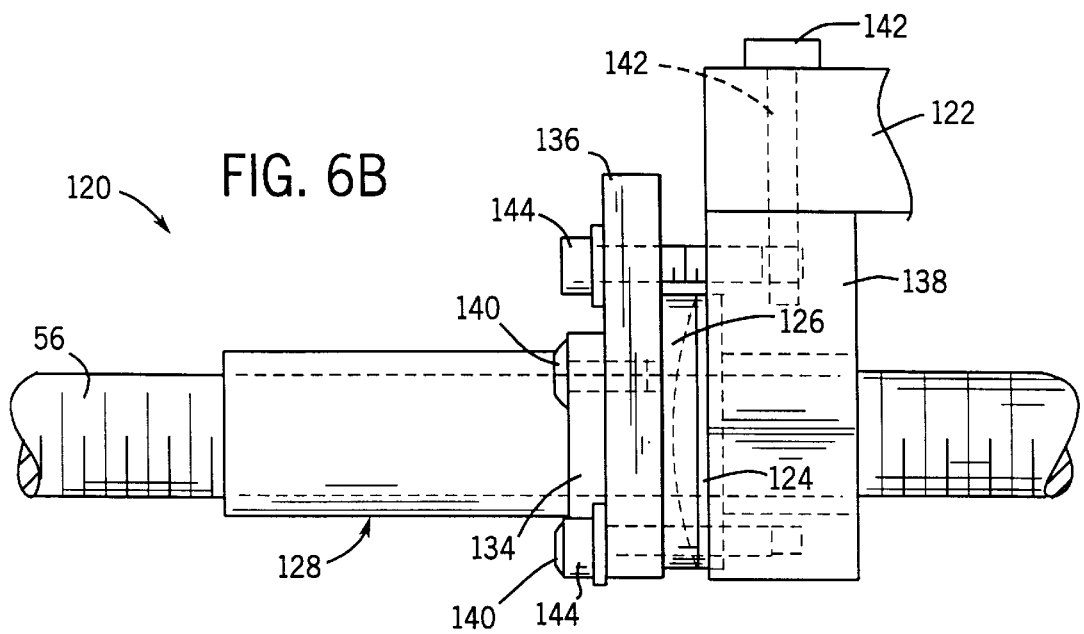

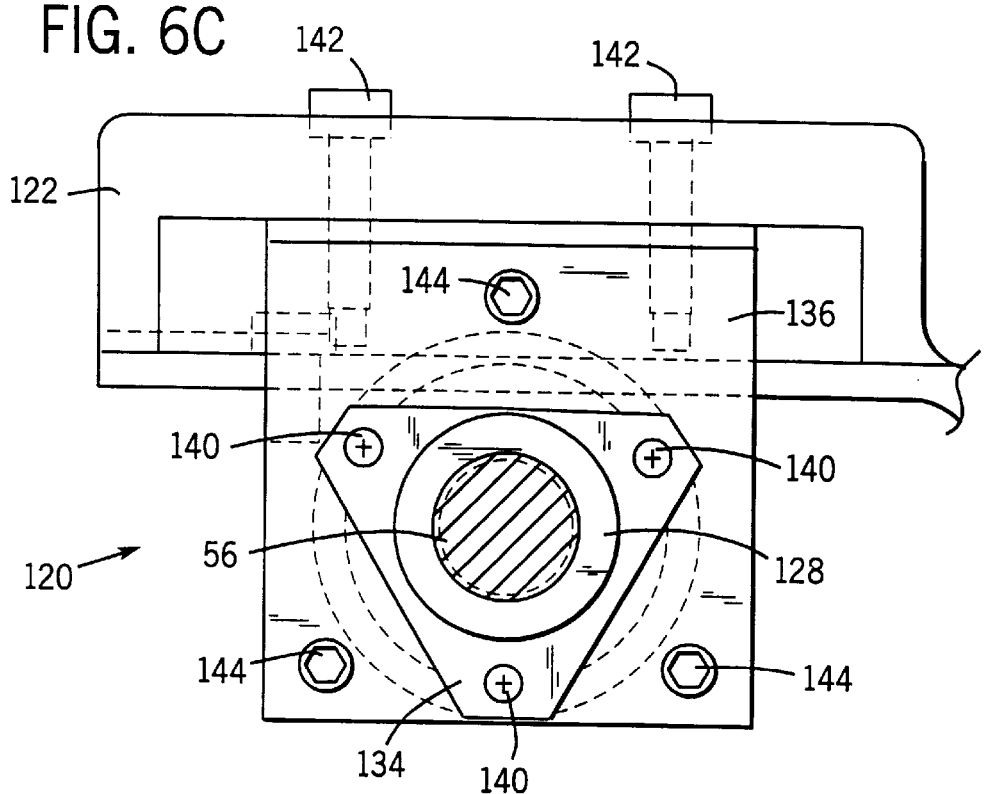
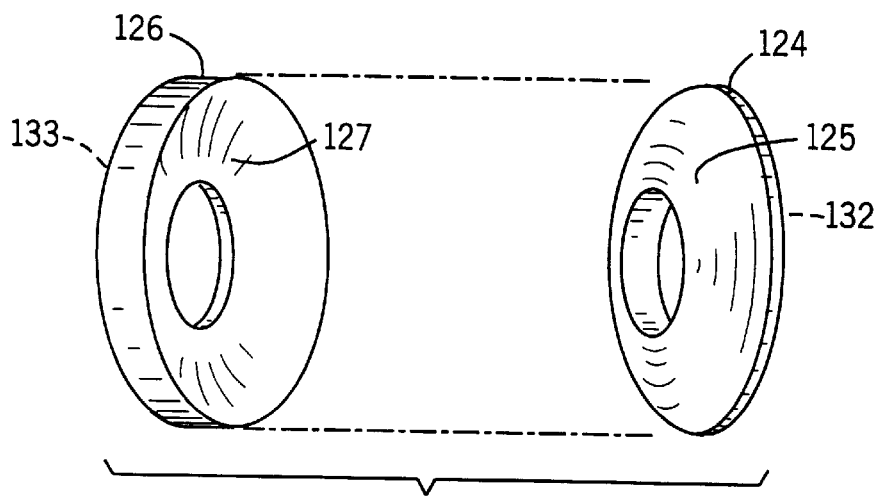

COORDINATE MEASURING MACHINE

BACKGROUND OF THE INVENTION

1. Field of the Invention

The present invention generally relates to improvements in the design and construction of a coordinate measuring machine (CMM). More particularly, the present invention relates to an improved CMM having a combination of features which result in high performance and low cost.

2. Description of the Prior Art

Coordinate measuring machines (CMMs) are well known in the art. The CMM typically has a probe mounted on a probe shaft, which is movable along a first axis to make measurements on a part. The probe shaft is typically mounted to a carriage which is movable along a second axis orthogonal to the first axis. The second axis is typically movable along a third orthogonal axis, thus allowing the probe to take measurements in all three coordinate axes. The movement of the probe or carriage is accomplished either manually in one type of CMM, where an operator grasps the probe shaft and physically moves it in the desired direction, or automatically in a more sophisticated type of CMM, where it is moved by an automatic controller driving a motor on each axis.

As is known in the art, there are several types of CMM configurations. The fixed-table cantilever-arm CMM provides easy access to the workpiece from three open sides, but its use is restricted to relatively lightweight parts since the table will deflect under the weight of the part. Furthermore, cantilever designs can have a low natural frequency, and large Abbe errors can occur if uncorrected. Various types of moving-ram horizontal-arm CMMs are also used to probe into horizontal recesses in parts. However, these cantilever designs are still susceptible to either large Abbe errors or horizontal beam vibrations.

Moving-bridge CMMs were then designed to overcome the cantilever-type CMM problems. Although moving-bridge CMMs could be built larger than cantilever machines and had higher natural frequencies, the moving-bridge CMM had problems with the outer leg "walking". To alleviate this problem, the ring-bridge CMM, as described in U.S. Pat. No. 4,594,791, was designed. Another CMM design, called the gantry-type CMM, provided an alternative solution to the "walking" leg problem. The gantry-type CMM has a lower platform and two fixed, rigid, upright pillars to provide support for the horizontal beam. Since the uprights are fixed to the base and are sufficiently rigid, there is no walking of any vertical members.

Coordinate measuring machines have been used for years for industrial quality control to inspect the products of computer numerical control (CNC) machine tools and to check feature locations of parts after machining. In fact, CMMs form the cornerstone of the concept of machined part interchangability, since CMMs can measure parts to a higher degree of accuracy than to which the parts were machined. As a result, part manufacturers can use CMMs to help control the quality of their manufacturing processes. Although the CMM was once considered an exotic tool found only in large manufacturing plants, the increased need for accurate measurement of components has become an important concern for small job shops as well.

However, the CMMs currently available are not particularly adapted for use by small machine shops due to their size and cost. The small job shop requires a CMM system which is compact so that the measuring machine takes up no more room than necessary. Furthermore, a large machine also requires more space in the manufacturing facility, where space is also at a premium. As the size of the machine increases, the required length of precision components, such as bearing rails and measuring scales, also increases, thereby adding to the cost of manufacturing. Many smaller CMM designs are simply reduced versions of their large predecessors, and have the same number of parts and manufacturing requirements. This miniaturization of the CMM does not necessarily reduce its cost. Hence, size and cost are important CMM considerations for small machine shops.

On the other hand, speed and accuracy are also major concerns for these CMM users. In order to accomplish the part measurement, the probe and the carriage must be easily movable. Ideally, the probe and carriage and related parts are lightweight. Typical high-performance coordinate measuring machines have high-speed axes which move quickly from point-to-point while making "measurements on the fly". This is accomplished with the use of a device called a "touch trigger probe", which is rigid until it touches the part surface. As the tip of the probe touches the object's surface, it triggers a signal to the CMM controller to measure and record the position of the CMM axes and to quickly decelerate the axial movements. A special probe linkage then allows the probe tip to be subjected to several millimeters of overall travel. This operating mode allows a series of rapid, high-speed measurements to be made. Greater accuracy can be obtained at the price of speed, depending on the design of the particular machine and probe. Accuracy is also dependent upon the use of a low-friction bearing arrangement, which, in turn, is related to the weight of the movable apparatus which is supported on the base.

Typical small machine shop users measure parts having a tolerance as small as five thousandths of an inch. A rule-of-thumb for CMMs is that the CMM accuracy should be approximately 10% of the part tolerance. In order to achieve such accuracy at low costs, the CMM must be stable, rigid, and perform repeatable measurements. Hence, it is critical that non-repeatable distortions of the supporting structures, such as the base and carriages, be avoided. Such distortions directly cause measurement errors due to a loss of precisely repeatable correspondence between the extent of the probe movement and the distance between the points to be measured. Since the carriages are oftentimes powered in their movement along a respective axis by an off-center driving force, the result is a skewing tendency which could introduce non-repeatable distortion forces acting on the carriage. Moreover, conventional mechanical drives for the carriages, such as ball screws or rack-and-pinions, are sufficiently stiff to provide good positioning of the carriage, but require maintenance and lubrication to avoid wear and misalignment. Conventional pneumatic counterbalance mechanisms, used to counteract the weight of the probe shaft, also require maintenance and adjustment to maintain the CMM accuracy. Hence, speed and accuracy cannot be compromised for size and cost.

A need, therefore, exists for an improved coordinate measuring machine having high performance and low cost for the small machine shop.

OBJECTS AND SUMMARY OF THE INVENTION

Accordingly, it is a general object of the present invention to provide a CMM having a low-cost design and high performance capabilities that overcomes the aforementioned disadvantages.

It is a more particular object of the present invention to provide a CMM having minimum part count and improved manufacturability to significantly reduce material and labor costs as compared to currently available CMMs.

It is a further object of the present invention to provide a CMM that eliminates requirements for pneumatic bearings and counterbalance cylinders, and allows the manufacturer to use readily available machining and assembly techniques.

The present invention provides a coordinate measuring machine (CMM) of the type including a probe mounted on a shaft extending vertically above a measuring table. The probe is movable along three orthogonal axes to enable measurements to be conducted by the generation of electronic signals corresponding to the extent of movement along each such axis. The probe shaft is movably mounted along the Z-axis extending vertically from a horizontal X-axis beam. The X-beam is, in turn, movably supported along two Y-axis beams on a rigid base.

The CMM design of the present invention utilizes a monolithic gantry-style base made of a polymer composite which is supported on three elastomeric isolators. The gantry-style base configuration exhibits stiff Y-axis upright support characteristics, and only requires a minimum number of parts, thus reducing the cost of the CMM. The base material has excellent damping characteristics and dimensional stability, and is capable of being manufactured using low-cost molding techniques. Since the coefficient of expansion of the polymer composite base is comparable to steel, the CMM exhibits excellent temperature stability. A premachined steel work surface is molded into the polymer composite base to act as the part support surface.

Steel beam structures are assembled to the polymer composite base to create the three moving coordinate axes. The X-beam cross-sectional orientation is horizontal, as opposed to the normal vertical orientation. This horizontal X-beam configuration provides the advantage that the overall machine height can be much lower. Furthermore, the X-axis linear rails are much easier to align using this orientation, and the design provides additional stiffness in the Y-direction in order minimize distortions and hysteresis as the X-beam is guided along the Y-axes by only moving one end of the beam. The end covers of the hollow X-beam are vented to allow air to flow through the beam to minimize thermal gradients in the X-beam.

The CMM axes are driven by anti-backlash Kerk-style screw drives, and the axes are guided on linear recirculating ball bearings. This provides a very quiet, smooth, low-friction motion. Moreover, the CMM incorporates a three-point bearing support configuration in the X, Y and Z axes. The Y-axis three-point support consists of two bearing packs on the right side and a single bearing pack on the left side to support the X-beam. The single bearing on the left side is attached to the X-beam by a single screw with a compliant rubber grommet. This compliant mounting technique compensates for the different lateral thermal growths of the steel X-beam versus the polymer composite base without causing geometrical distortion in the X-beam or the base. The compliant coupling also allows looser parallelism requirements for the Y-axis rails.

The probe shaft mounting arrangement consists of two bearing packs on a main rail and a single bearing pack on a secondary rail. The bearing pack on the secondary rail is mounted to the Z-axis carriage via a spring steel flexure support. This flexure support provides stiff guidance in the Y-direction, but compliance in the X-direction. In this way, the machining requirements on the Z-axis probe shaft can be reduced, while still providing a rigid repeatable Y-axis support for proper guidance.

The combined Z-axis counterbalance and drive assembly of the present invention provides the counterbalance to counteract the weight of the Z-axis probe shaft assembly and provides a mechanism to drive the Z-axis probe shaft with a conventional DC servo motor. This configuration advantageously requires no pneumatic components, provides a compact design for reduced machine height and weight, and uses a minimum number of parts.

The present invention further provides a new design for an X-beam or Y-beam drive nut assembly. This drive nut design provides the advantages of a direct in-line attachment mechanism, e.g., high axial and roll stiffness, with angular alignment capability of the drive nut and screw assembly. It also offers the advantage of being able to be attached to non-parallel carriage surfaces, exhibits a compact design, requires a minimum number of parts, and provides for ease of assembly.

Hence, the present invention provides a new CMM having low cost and high performance due to its design and construction. The present invention includes a polymer composite gantry-style base having two Y-shaped pillars, a Y-beam on each pillar, and an X-beam extending between the two Y-beams resting on bearings, wherein the bearings incorporate a three-point support configuration in the X, Y, and Z axes. The X-beam is hollow, has a horizontal cross-sectional orientation, uses a passive ventilation technique, and is attached to the bearing at one end by a compliant mount. The Z-axis probe shaft incorporates a new combined counterbalance/drive assembly and a compliant secondary rail guide mechanism. The X-axis and Y-axis drive screws have angular alignment capability. This combination of features serves to minimize non-repeatable errors caused by wear or temperature, and the repeatable machine errors are compensated by error correction in the CMM firmware.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description when taken in conjunction with the accompanying drawings in which:

FIGS. 2A–2D are perspective, front side elevational, top plan, and left side elevational views, respectively, of the CMM of FIG. 1;

FIG. 3 is an enlarged, cross-sectional, left side elevational view of the X-beam of the CMM of FIG. 2, showing the horizontal X-beam configuration of the present invention;

FIG. 4 is an enlarged, cross-sectional, front side elevational view of the X-beam of the CMM of FIG. 2, showing the compliant mounting technique of the left side X-beam bearing support along the Y-axis in accordance with the present invention;

FIGS. 6A–6C are enlarged, top plan, front side elevational, and left side elevational views, respectively, of the X- or Y-axis screw drive nut assembly of the CMM of FIG. 2 in accordance with the present invention; and FIG. 7 is an enlarged, perspective view of both spherical washers used in the screw drive nut assembly of FIG. 6.

DETAILED DESCRIPTION OF THE PREFERRED EMBODIMENT

Figure 1:
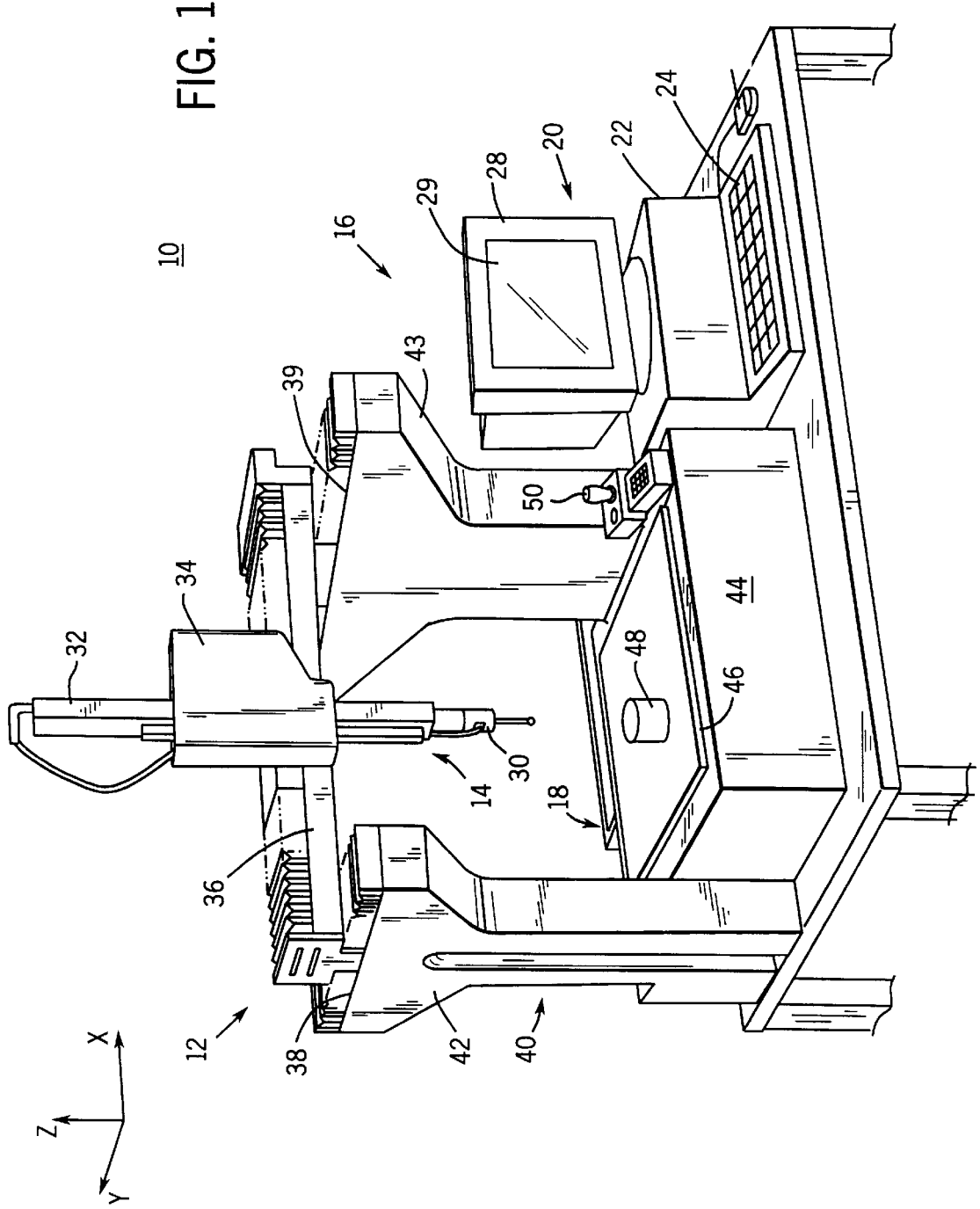
FIG. 1 is a perspective view of a typical CMM system having the improved CMM according to the present invention.

Referring now to FIG. 1, there is illustrated a coordinate measuring machine (CMM) system generally indicated by the reference numeral 10. The CMM system 10 includes a CMM or similar X-Y-Z positioning device, generally indicated as 12; a probe system 14; and a control system, generally indicated as 16. The control system 16 includes a machine controller 18, computer hardware 20, and computer software for programming the hardware. In the preferred embodiment, the computer hardware 20 includes an IBM-compatible personal computer (PC) 22 having a keyboard 24, a mouse 26, and a video display monitor 28 having a display screen 29.

The probe system 14 includes a probe 30 which is inserted into a Z-axis probe arm or shaft 32 of the CMM 12. The probe shaft 32 is supported and guided for movement in the Z-direction by a Z-axis carriage 34 using mechanical bearings, preloaded air bearings, or the like. In the preferred embodiment, the Z-axis carriage 34 is combined with the X-axis carriage, and this X/Z-carriage 34 is supported on a top rail of the X-axis beam 36 by bearings. Again, in the preferred embodiment, the X-beam 36 is combined with the Y-axis carriage, and this X-beam/Y-carriage 36 is supported and guided by bearings on Y-beams 38, 39 for movement in the Y-direction. Y-beams are supported on a base 40 having a pair of Y-shaped pillars 42, 43 attached to a platform 44 having a worktable 46, which typically contains tapped holes to facilitate the clamping and locating of parts.

In a typical operation, the part to be measured 48 is placed on the worktable 46 of the CMM at a desired location. Generally, this location is approximately central to the machine X-Y-Z axes in order to access all of the part surfaces to be inspected with the probe. The measuring envelope or volume is defined by the X-Y-Z travel of the machine. Depending upon the size of the part and the type of probe used, the part may need to be clamped to the machine table. The probe is then moved, manually or under machine control using the joystick 50 or computer part program, until contact is made with the desired part feature. Reader heads, travelling on each axis along built-in axis measuring scales, transfer the instantaneous machine position to the computer interface where the software performs three-dimensional geometric analysis. The dimensions and geometries may then be calculated, compared, evaluated, stored, or printed-out as required.

For further details regarding the overall construction and operation of a typical CMM and the computer interface therefor, refer to U.S. Pat. Nos. 4,594,791, 4,819,195, 4,928, 396, 4,945,501, and 5,257,461, all of which are hereby incorporated by reference as if fully set forth herein. An example of a coordinate measuring machine which can be used with many of the features of the present invention is the CORDAX (trademark of Giddings & Lewis, Inc.) model number RS-5 available from the Sheffield Measurement division of Giddings & Lewis, Inc. located in Dayton, Ohio.

Figure 2A:
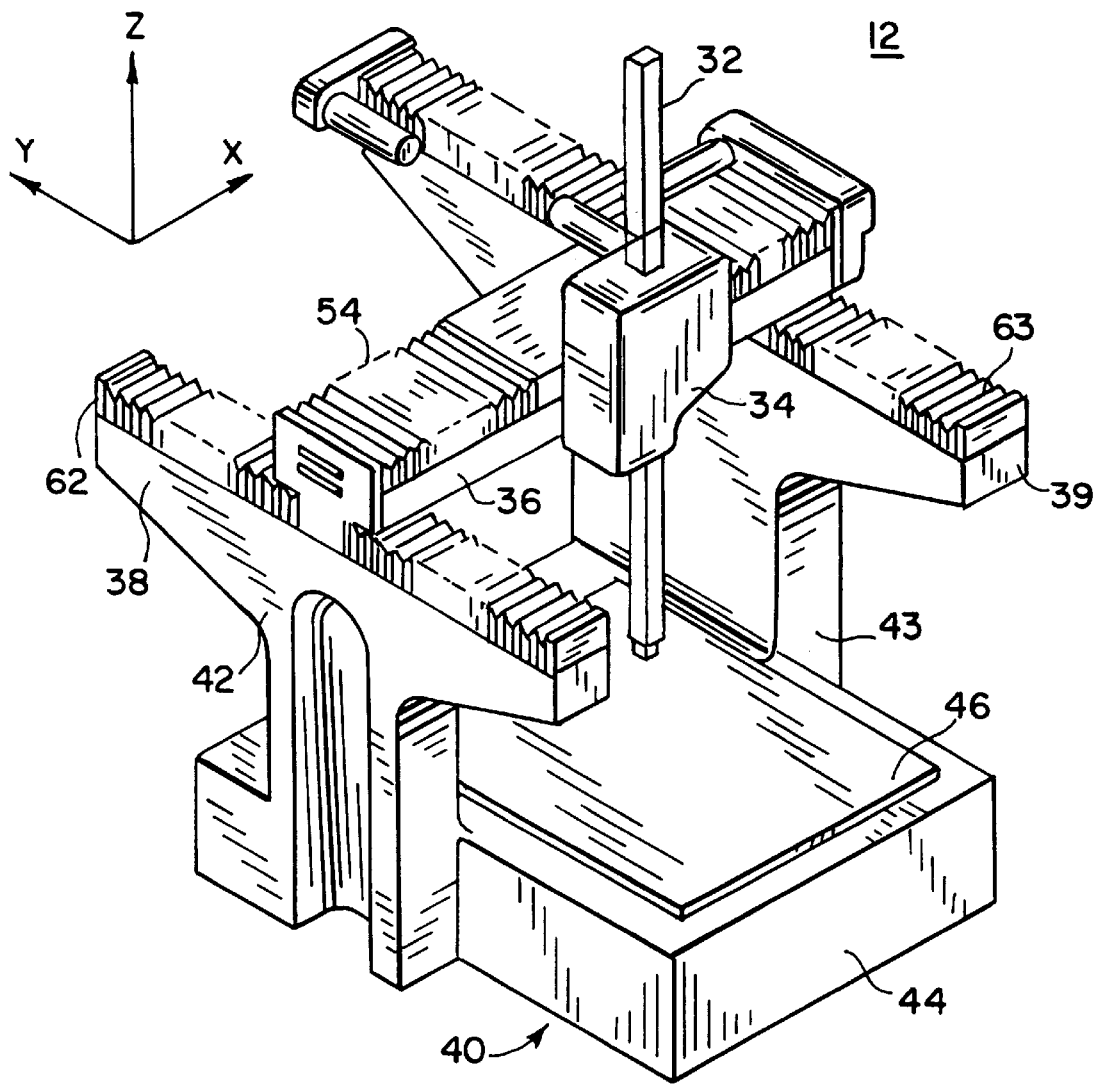
Figure 2C:
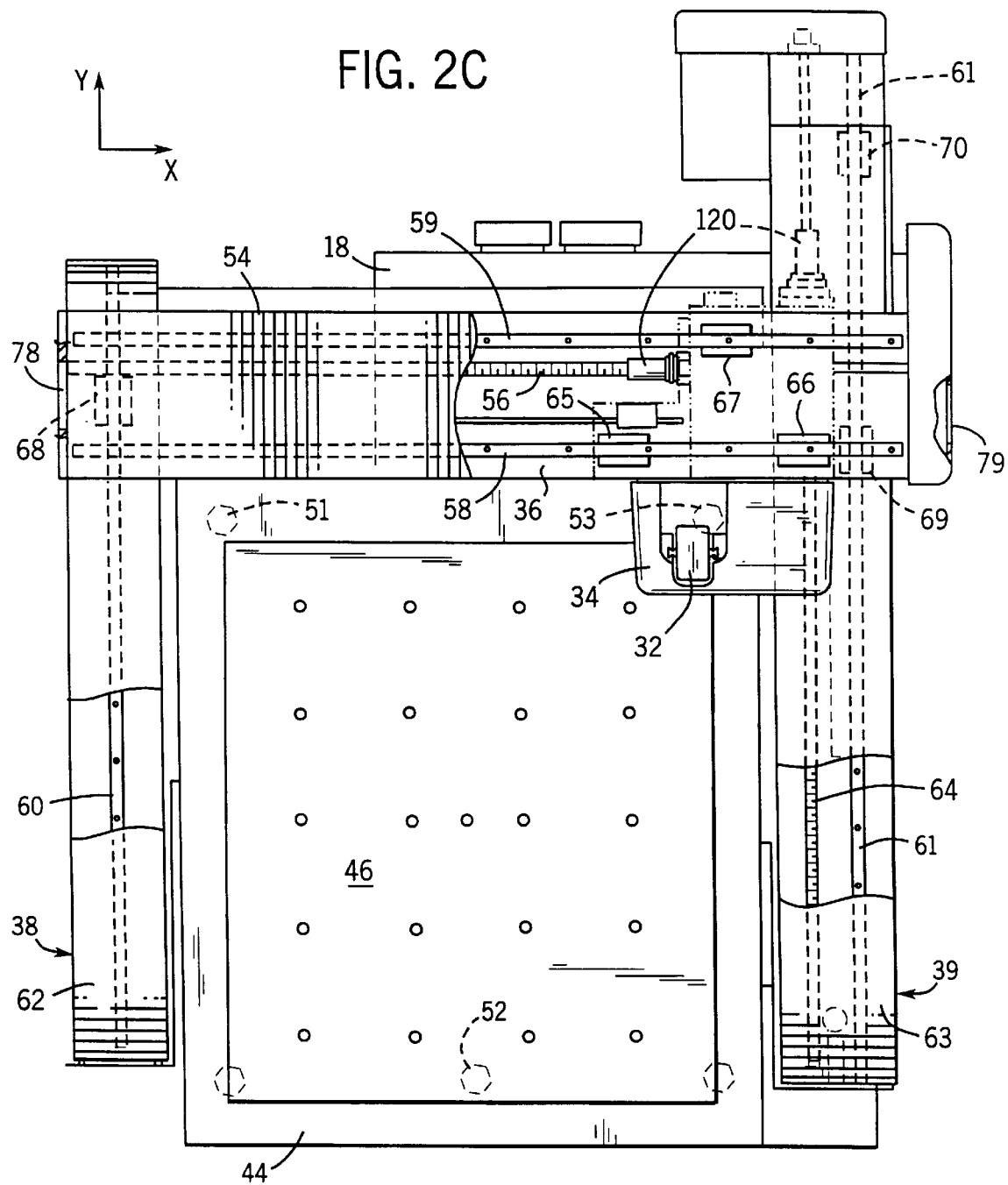

FIG. 2A is a perspective view of the CMM 12 of FIG. 1 in accordance with the present invention. FIG. 2B is a front side elevational view thereof, FIG. 2C is a top plan view thereof, and FIG. 2D is a left side elevational view thereof. As mentioned above, the CMM design of the present invention utilizes a monolithic, molded base 40 having a modified gantry-style design as shown in FIG. 2A. The base has a lower, rectangular, horizontal platform 44 having the worktable 46 on its upper surface. The base 40 also has two vertical Y-shaped pillars 42, 43 integrally attached to opposite sides of the horizontal platform 44 as shown.

The base 40 is solid and is casted from a polymer composite, which would include a polymer such as epoxy resin, and an aggregate such as quartz, granite, or concrete. The coefficient of expansion of the polymer composite base is comparable to that of steel. Hence, the polymer composite allows lateral thermal growth of the steel X-beam 36 versus the base, without causing geometrical distortion in the X-beam or the base. The polymer composite base material also has excellent damping and dimensional stability, and is capable of being manufactured using low-cost molding techniques. In the preferred embodiment of the invention, the base material is a ZANITE (trademark of Precision Polymer Castings, Inc.) polymer composite available from Precision Polymer Castings, Inc. of Chardon, Ohio. Alternatively, the polymer composite base could be made in accordance with the process described in U.S. Pat. No. 4,696,839, which is hereby incorporated by reference.

The use of a cast base allows the CMM of the present invention to achieve a very low cost, because the majority of the expense is attributed to the creation of a single precision mold while minimizing the costs of each individual molded base. This technique offers improved manufacturability since the base can be molded and used without the need to do any machining. However, the polymer composite base does not provide an acceptable air-bearing surface for the CMM, because there remains a small amount of a resin coating on the base which is typically too soft for a bearing or work surface. However, in accordance with the present invention, a CMM having the combination of mechanical bearings with the polymer composite base allows one to utilize the cost and performance advantages of the polymer composite base material without suffering the disadvantages.

In the preferred embodiment, the base platform 44 has dimensions of 26.25 inches wide by 32.35 inches deep by 8 inches tall. The left pillar 42 is 28.94 inches high, from 4 to 5 inches thick (tapering downwardly), and 10 inches wide at the lower portion expanding to 37.40 inches at the top of the Y-shaped upper portion. The right pillar 43 is 28.94 inches high, 5 to 6 inches thick, and 15.5 inches wide at the lower portion expanding to 48.8 inches at the top of the Y-shaped upper portion. Overall, the base 40 is 37.25 inches wide including the two pillars, 28.94 inches high, and 51.44 inches deep at its deepest part.

The CMM 12 also includes a pre-machined steel work surface or worktable 46 which is molded into the polymer composite base platform 44 to act as the part support surface. The worktable 46 is constructed of a rigid material such as steel to avoid distortions caused by the weight of heavy parts placed on the table. The base 40 itself is supported on a table or on a stand using three elastomeric isolators 51, 52, 53. These three isolators function to isolate the CMM from floor vibrations, and provide a secure, three-point foundation to prevent rocking or tipping on an uneven shop floor.

Steel beam structures are assembled to the base pillars to create the three moving coordinate axes. The X-beam 36 is a hollow beam having a rectangular cross section and collapsible bellows 54 to cover the X-axis drive screw 56 and X-axis guide rails 58, 59 and associated drive components. The Y-beams 38, 39 are comprised of the top surfaces of the Y-shaped pillars 42, 43, and corresponding guide rails 60, 61. Collapsible bellows 62, 63 cover the Y-axis drive screw 64 and guide rails 60, 61 and associated drive components. The steel beam components are painted using an electro-deposited paint which is controlled to a specified thickness. The carriages and beams are hollow and are constructed to be as lightweight as possible to improve dynamic performance when servo drives are employed. The CMM is driven by anti-backlash Kerk-style drive screws 56, 64. The axes are guided on mechanical bearings. In the preferred embodiment, the bearings used on the CMM are linear recirculating ball bearings manufactured by THK America Inc., Schaumburg, Ill., as type SSR Super Silent LM guide bearings. The SSR-style bearings incorporate a retainer to separate the individual ball bearings. This provides a very quiet, smooth, low-friction motion.

Note in FIG. 2 that all of the guide bearings for the CMM incorporate a three-point mounting configuration in the X, Y and Z axes. For example, in FIG. 2C it can be seen that the X/Z-carriage 34 rides on the X-beam 36 on three bearing packs 65, 66, 67, two in the front and one in the back, which are guided by rails 58, 59. The X-beam/Y-carriage 36 also rides on three bearing packs 68, 69, 70 on the two Y-beam rails 60, 61 as shown. Here, two mounting points are on the right side pillar 43, and one mounting point is on the left side pillar 42. The same three-point mounting technique is used for the Z-axis probe shaft, as will be seen below in FIG. 5A.

This three-point mounting technique is an important part of the present invention, since it allows for looser tolerances with respect to parallelism of the ways. Using this technique, the accuracy of the CMM will not be affected by large parallelism differences between the Y-rails, even up to many thousandths of an inch. For example, as long as a three-point bearing support is used, only a rolling type of motion can be imparted onto the X-beam/Y-carriage assembly as it progresses along the Y-axis such that the left side of the X-beam will raise or lower relative to the right side. The underlying principle of the three-point support is to avoid overconstraining the beam movement by having more than three points in each of the X-Y-Z planes.

In many prior CMM's having a four-point support, these parallelism tolerances would have to be held much tighter because one bearing would almost always be slightly higher or lower than the other three, always making the mounting unstable. An unstable four-point mount would affect repeatability of the measurements, and ultimately the accuracy of the CMM. However, in many CMM designs, is not physically possible to have three-point supports due to the weight capacity of the bearings as well as the rigidity requirements of the structure. The use of lighter structures helps to allow the use of fewer bearings to support the loads.

In a low-cost CMM, particularly one using a cast polymer composite base, the three-point mounting configuration is very important to minimize the required machining tolerances. Even if one does achieve tight molding tolerances for the base, it still leaves the requirement for a certain amount of parallelism between the Y-axis rails 60, 61. If a four-point mounting configuration were used, a secondary machining operation would be required to achieve the final parallelism tolerances required to make the machine functional. Hence, the present invention uses a gantry-style base having two Y-shaped pillars and a Y-beam on each pillar and an X-beam extending between the two Y-beams resting on bearings, wherein the bearings incorporate a three-point configuration in the X, Y and Z axes.

FIG. 3 is an enlarged, cross-sectional, left side elevational view of the X-beam 36 of the CMM 12 of FIG. 2. This figure shows the horizontal X-beam configuration of the present invention. The horizontal X-beam configuration is present whenever the larger dimension of the cross-section of the X-beam is horizontal, or, in other words, the X-beam is wider than it is tall. This beam orientation provides the additional stiffness in the Y-direction in order minimize distortions and hysteresis as the X-beam is guided only on the right side of the CMM base. Hence, the horizontal X-beam configuration provides additional stiffness in the horizontal plane over the vertical X-beam configuration or a square cross-section configuration. This is particularly advantageous with the modified gantry-style CMM of the present invention. Note that the left side Y-axis rail 60 has a single bearing 68, while the right side Y-axis rail 61 has two bearings 69, 70. In order to maintain accuracy, the X-beam must be as rigid as possible in the Y-direction because the powered guide rail is only on the right side. Maximum stiffness in the Y-direction and a wider spread between the Y-axis rails is achieved with the horizontal X-beam configuration shown in FIG. 2 and FIG. 3. It also provides advantages from a CMM packaging standpoint, in that the horizontal orientation is lower in height than the vertical orientation.

The primary disadvantage of the horizontal X-beam configuration is that the X-beam would have a greater amount of sag than the vertical orientation. However, the CMM of the present invention has minimized the effect of this disadvantage by making the X-beam hollow and lighter weight than in previous designs. More importantly, however, the sag of the X-beam in the vertical direction is a repeatable deflection that can readily be compensated for in software. In accordance with the present invention, the CMM software program takes into account any such deflection and compensates for it. Such a compensation technique is disclosed in the aforementioned patents which have been incorporated by reference.

Referring now to FIG. 4, a cross-sectional, front side elevational view of the left end of the X-beam 36 is shown. This figure most clearly illustrates the compliant mounting technique of the left side Y-axis bearing support of the X-beam in accordance with the present invention.

As mentioned above in connection with the three-point mounting technique, a low-cost CMM cannot have high tolerance requirements with respect to the two Y-axis rails being exactly parallel. Moreover, the CMM will be located in environments where the temperature will change. As the temperature raises, the hollow steel X-beam will respond to and track that temperature closely. However, the solid polymer composite base, having a large thermal mass, will not track the temperature changes exactly. Therefore, the X-beam 36 will attempt to grow or lengthen faster than to the base 40. If the X-beam bearing blocks were securely attached to the beam, and the Y-axis rails were securely attached to the base, then the X-beam would put an undesired side force on the bearing blocks which would impede the free motion of the X-beam. Consequently, the X-beam would bow, either in a concave or convex manner, to accommodate for the thermal growth of the beam. This places stress or distortion on the X-beam, which is not a repeatable error which can be compensated for in software.

It can be seen in FIG. 4 that the single bearing block 68 on the left side of the X-beam 36 is attached to the X-beam by a single screw 72 coupled to the X-beam with a compliant rubber grommet 74 sandwiched between two steel washers 73, 75. The screw is securely threaded into the bearing block 68 as shown. Hence, the single compliant point of coupling allows the bearing to move in the ±X direction with respect to the X-beam, as well as in the ±Y direction or ±rotation about the axis of the screw 72, while at the same time providing the required stiffness in the +Z direction. With the compliant mount, the bearing only provides a mechanism to support the weight of the cantilever portion of the X-beam.

The use of this compliant X-beam mounting technique serves to simplify the thermal considerations involved in the use of a small thermal mass tubular steel X-beam and a large thermal mass polymer composite Y-beam base. The compliant X-beam mount allows for lateral thermal growth of the steel X-beam versus the polymer composite base, without causing geometrical distortion in the X-beam or the base. It allows the X-beam to grow and maintain its straightness. Otherwise, it could create a pitch, roll, or yaw condition in the X-beam at a certain temperature that cannot be characterized and corrected for with the error correction software.

The compliant X-beam mounting technique of the preferred embodiment also allows looser parallelism requirements for the left rail mounting surface 38 to the main right rail mounting surface 39, and looser rail alignment requirements between the right main rail 61 and left rail 60. Otherwise, using a fixed mount, the parallelism between the left and right rails would have to be very closely controlled, because the distance between the two rails is typically either slightly closer together or slightly farther apart at one end versus the other end. If there was no compliance in the X-direction, some distortion or binding or hysteresis would occur unless the rails are perfectly aligned. Instead, the use of the compliant mount, which only provides a vertical support force to the left rail, prevents the rails from imparting any side forces to the X-beam. Since all the guiding of the X-beam 36 is controlled by the right side rail 61, the attachment to the left side rail 60 should be compliant. The present technique of using a single bearing 68 on the left side, attached to the X-beam by a single screw 72 coupled with a rubber grommet 74, serves to accomplish this purpose.

Referring again to FIG. 4, as well as FIG. 2B and FIG. 2D, it can be seen that the ends of the X-beam are covered with end covers 76, 77 for purposes of safety and appearance. However, note that both end covers 76, 77 of the X-beam are vented to allow air to flow therethrough. This prevents the trapping of air inside the hollow X-beam which serves to minimize thermal distortions of that beam. In the preferred embodiment, the ends of the X-beam are capped and vented using slots 78, 79 in the covers.

As shown in FIG. 2B, the plastic cover 77 on the right end of the X-beam includes a pair of horizontal slots 79 for ventilation. These vents are molded in, but could also be stamped or drilled depending upon the preferred manufacturing method. The left end cover 76 of the X-beam contains two stamped slots 78 for ventilation as shown, but again could be formed as a small series of holes or other vents. Either way, the passive ventilation through the X-beam is very inexpensive to manufacture and adds to the accuracy of the CMM. More elaborate active ventilation techniques could be used in other CMM configurations where the passive ventilation does not sufficiently reduce thermal gradients.

Figure 5A:
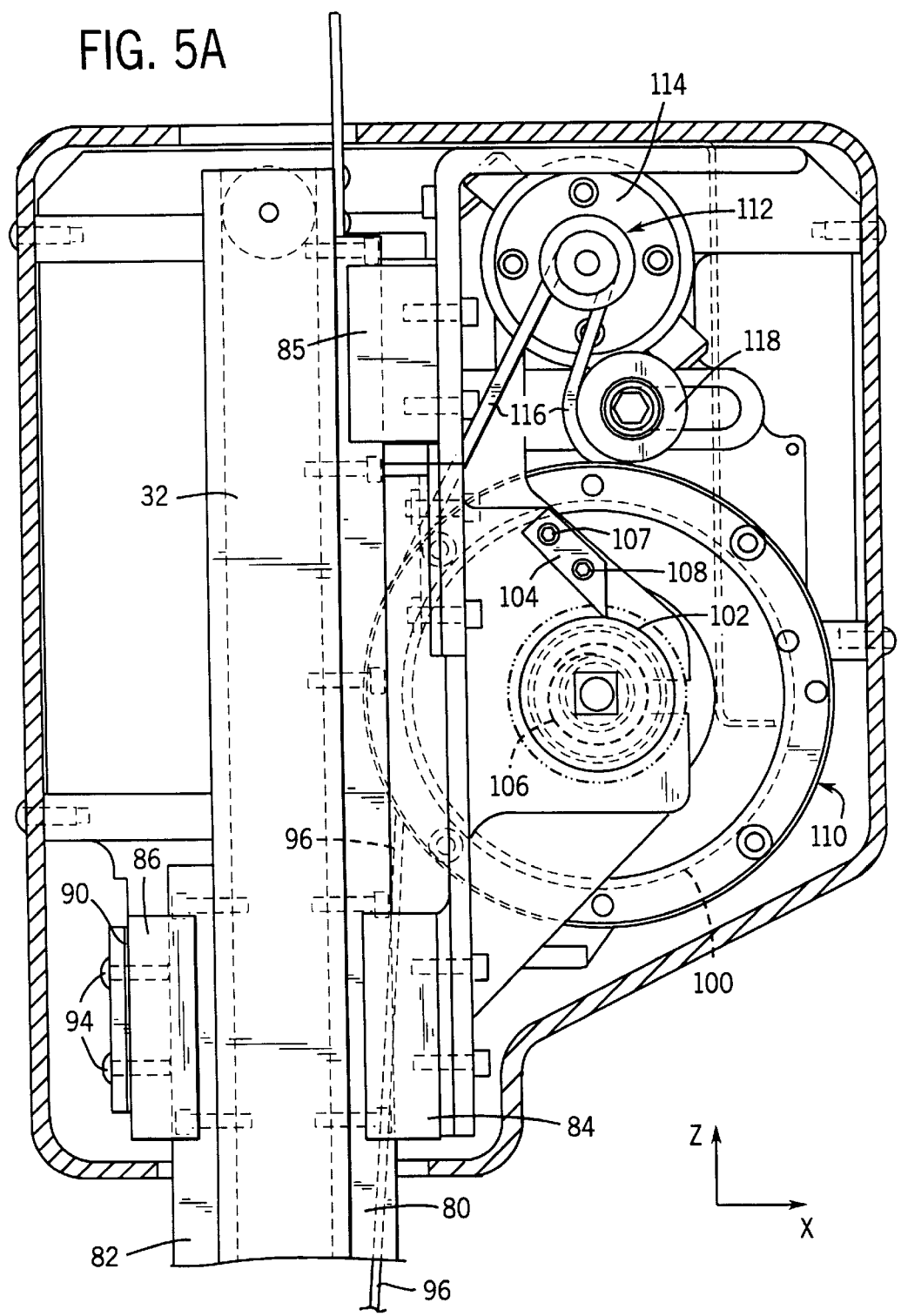
FIGS. 5A–5C are enlarged, cross-sectional, front side elevational, left side elevational, and top plan views, respectively, of the X/Z-carriage assembly of the CMM of FIG. 2, showing the probe shaft counterbalance/drive mechanism and the secondary rail mounting scheme in accordance with the present invention.
Figure 5B:
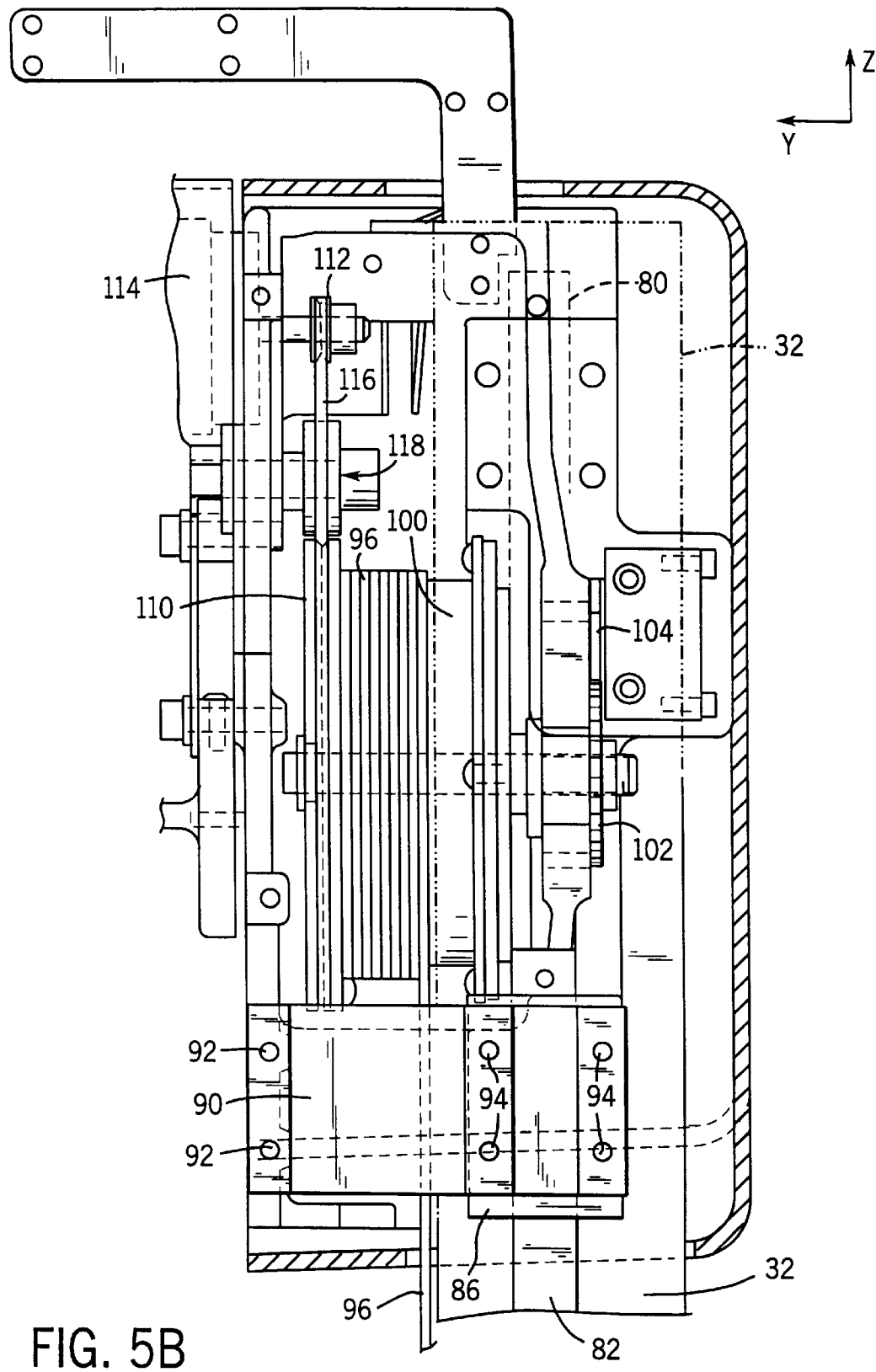
Figure 5C:
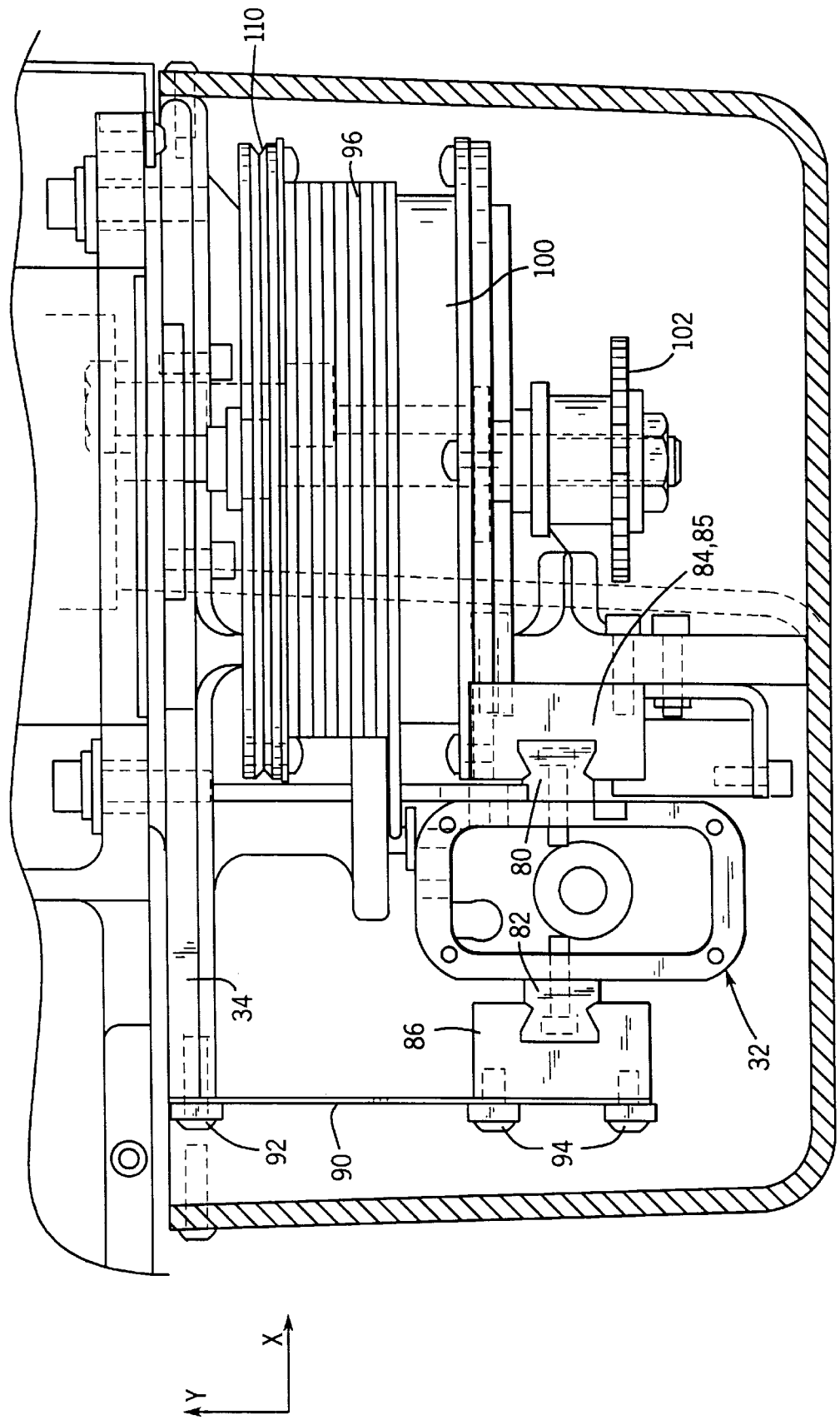

FIGS. 5A–5C are enlarged, cross-sectional, front side elevational, left side elevational, and top plan views, respectively, of the X/Z-carriage assembly 34 of the CMM 12 of the present invention. As mentioned above, the Z-axis probe shaft 32 is also guided using a three-point mount. In FIG. 5A it can be seen that the probe shaft has two guide rails 80, 82. The right side rail 80 is supported by two bearings 84, 85 separated by approximately eight inches. The third bearing 86 on the left side rail 82, on the opposite side of the probe shaft, provides the third mounting point. Hence, from a stability standpoint, the three points provide the minimum number needed to create a constrained axis.

As can be seen most clearly in FIG. 5C, the left side bearing 86, which guides the secondary rail 82, is mounted to the X/Z-carriage 34 using a flexible support member 90. In the preferred embodiment, the flexible support member 90 is essentially a bendable leaf spring which is compliant only in the ±X direction. The spring is thirty-two thousandths of an inch thick spring steel having dimensions of 2.0 inches by 4.0 inches. The spring member 90 is attached to the X/Z-carriage 34 by two screws 92, and the bearing block 86 is attached to the member 90 by four screws 94.

This flexure mounting technique for the probe shaft provides rigidity in the Y-direction which is needed to prevent the probe shaft from having a tendency to roll. However, compliance in the X-direction is desired because it reduces the manufacturing requirements of parallelism of one side of the probe shaft to the other side, and it loosens the tolerance requirements for the entire combination of tolerances including location of the flexure mount to the X/Z-axis carriage, rail thickness, bearing thickness, probe shaft thickness, etc. This Z-axis flexure support feature allows many of the CMM parts to be machined using inexpensive milling operations without precision machining requirements. Both sides of the probe shaft can be machined to a certain parallelism to make the guide bearings work without binding, without the need for tight tolerances in the X-direction. This flexure support provides a very stiff mount in the desired direction and compliance in the other direction, in much the same way as the X-beam compliant mount described above.

Vertically mounted probes must be easily movable in response to the desired movement by an operator. However, the probes must not be freely movable when no movement is desired, as otherwise the weight of the probe would bring it down and present a safety hazard. Several systems have been designed to counterbalance the weight of the probe shaft to prevent it falling downwards and thereby possibly causing injury or damage. In the prior art, counterbalancing systems include mechanical, electrical, and pneumatic counterbalances. Air or pneumatic counterbalances have undesirable friction which makes it difficult to move the probe shaft, and characteristically have been large and heavy. Moreover, the probe shaft drive mechanism was typically an additional mechanism added on to the counterbalance mechanism. The present invention includes a combined counterbalance and Z-axis drive system for the vertically mounted probe.

As shown in FIGS. 5A–5C, a steel aircraft cable 96 is attached to the bottom of the probe shaft 32, routed upwardly along the length of the probe shaft, and coiled around a spring-powered take-up reel 100. A sprocket 102 and pawl 104 mechanism is provided to allow easy and safe pre-loading wind-up of the spring 106 inside the reel 100 to obtain correct balance of the probe shaft weight. The pawl 104 pivots about a first screw 107, and is secured to the X/Z-carriage by a second screw 108. The Z-axis drive mechanism consists of a large pulley 110 mounted to the reel 100, a smaller motor pulley 112 attached to a DC servo motor 114, a V-flex belt 116 wrapped around the two pulleys 110, 112, and an idler bearing 118 to provide preload to the belt 116 and proper belt wraparound tension for the motor pulley 112. Hence, the Z-axis counterbalance and drive assembly provides the counterbalance for the weight of the probe shaft assembly and, using the same mechanism, a powered drive for the probe shaft using a conventional DC torque motor.

During assembly of the CMM, the cable 96 is first attached to the lower end of the probe shaft 32. Then the second screw 108 of the pawl 104 is removed such that the pawl can rachet on the sprocket 102 as the internal spring is tensioned by turning the center shaft, connected to one end of the band spring 106, clockwise using a socket wrench on the shaft nut. As the tension is increased, the take-up reel 100, forced by the other end of the spring 106, begins to counteract the force of gravity on the probe shaft 32. Eventually, an equilibrium will be reached where the probe shaft weight is completely counterbalanced by the tensioned spring 106. At that point, the second screw 108 is replaced and tightened.

In operation, the reversible DC servo motor 114 drives the pulleys 112, 110 such that the entire take-up reel 100 counterbalance assembly is rotated in accordance with the desired amount of Z-axis movement of the probe shaft as determined by the CMM controller. By driving the counterbalance assembly itself as shown, the use of complex pneumatic counterbalance cylinders is avoided, and the entire counterbalance/drive mechanism is simplified in terms of cost, part count and complexity, reliability, and manufacturability. Moreover, a less powerful motor can be used, which further reduces the cost. Note also that the use of the flexible cable allows for misalignment between the probe shaft and the counterbalance reel, because it is compliant in the X- and Y-axis directions. The counterbalance/drive assembly of the preferred embodiment also allows for reductions in height of the CMM as opposed to other types of drive mechanisms.

Referring now to FIGS. 6A–6C, different views are illustrated of the X-axis screw drive nut assembly 120 of the CMM 12 of FIG. 2, showing the angular alignment technique in accordance with the present invention. This drive nut assembly 120 is substantially the same for both the X-axis drive screw 56 and the Y-axis drive screw 64, so only one will be described here.

The drive nut assembly 120 is mounted to the X-beam/Y-carriage frame 122 utilizing a mating pair of spherical washers 124, 126. The spherical washers 124, 126 provide axial stiffness on mounting surfaces, without applying a moment to the drive nut 128. This spherically washer arrangement provides correct angular alignment capability to minimize side forces on the drive nut due to drive screw misalignment or out-of-straightness of the drive screw which could otherwise result in binding and degradation in accuracy.

The pair of spherical washers 124, 126 used in the drive nut assembly 120 are shown in the enlarged, perspective view of FIG. 7. The spherical washers are comprised of a first washer 124 having a convex surface 125 and a second washer 126 having a concave surface 127. These two surfaces are matingly engaged in a manner similar to a ball and socket to provide axial angular alignment capability. Note that one side 132 of the first washer 124 is flat, and the other side 125 is convex. Similarly, one side 133 of the second washer 126 is flat, and the other side 127 is concave. The convex side 125 of the washer 124 is adapted to mate with the concave side 127 of the washer 126, such that the combination of the two washers provides two flat outer surfaces which can be non-parallel.

During assembly of the CMM, the drive nut 128 is first threaded onto the drive screw 56. The drive nut 128 is made from a self-lubricating polyacetal plastic such as a DELRIN (trademark of DuPont Corporation, Wilmington, Del.) polymer, so no lubrication is required, noise is reduced, and friction is minimized. However, since the drive nut flange 134 is also plastic, a steel adapter plate 136 is inserted between the spherical washers 126 and the flange 134. The adapter plate has an oversize hole in its center to allow the drive screw to freely pass therethrough. The triangularly-shaped drive nut flange 134 is secured to the square adapter plate with three or more screws 140. The nut block 138 is secured to the frame 122 using two or more screws 142. Then the adapter plate 136 is loosely attached to the nut block 138 using three or more screws 144, which surround the spherical washers 124, 126 at approximately 120 degrees. Since the hole in the washers is also oversize, the washers will slide and seat properly as the screws 144 are hand-tightened. When properly seated, the screws 144 are tightened and the drive nut assembly 120 is aligned.

Note that the drive nut 128 travels back and forth along the drive screw 56 with the carriage, and the carriage is guided by the rails. However, since the rails are seldom perfectly in line with the axis of the drive screw, the surface of the adapter plate 136 will not be perfectly parallel to the corresponding surface of the nut block 138. If these two surfaces were screwed together flush, the drive nut would bind on the drive screw. This would increase the friction along the drive assembly, increase its wear and decrease its life, and eventually cause accuracy problems.

However, by progressively finger-tightening all three adapter plate screws 144, the spherical washers are caused to move to a neutral position to accommodate any misalignments between the adapter plate and the nut block surface. Any misalignment gaps between the adapter plate and the nut block are eliminated by the spherical washers. The mating of these two washers together in the drive nut assembly 120 allows for anywhere from zero to five degrees of angular compensation for non-parallelism between the drive screw axis and the corresponding guide rail. Hence, the drive nut assembly of the present invention provides a variable range of angular alignment capability in a direction that is not parallel to the axis of the drive screw, and the desired rigidity in a direction parallel to the axis of the drive screw. Moreover, the assembly is very cost effective and easy to manufacture.

In review, it can now be seen that the present invention provides an improved coordinate measuring machine having low cost and high performance due to its design and construction. The present invention includes a polymer composite gantry-style base incorporating a three-point support configuration in the X, Y, and Z axes. The X-beam is hollow, has a horizontal cross-sectional orientation, uses a passive ventilation technique, and is attached to the bearing at one end by a compliant mount. The Z-axis probe shaft incorporates a new combined counterbalance/drive assembly and a compliant secondary rail guide mechanism. The X-axis and Y-axis drive nuts have angular alignment capability using a spherical washer configuration that is in-line with the drive screws. This combination of features serves to minimize non-repeatable errors and enhance the manufacturability of the CMM, providing substantial improvements in CMM design and construction.

While specific embodiments of the present invention have been shown and described herein, further modifications and improvements may be made by those skilled in the art. In particular, it should be noted that the CMM system described herein was chosen in the preferred embodiment only as a representative CMM for a particular application. However, any CMM having a configuration that could be retrofit to include the features of the present invention could be used. Numerous modifications may also be made to customize the present invention for various other applications. All such modifications which retain the basic underlying principles disclosed and claimed herein are within the scope and spirit of the invention.

What is claimed is:

1. A coordinate measuring machine (CMM) comprising:
    a gantry-style base having two individual pillars affixed thereto;
    a Y-axis beam disposed on each pillar;
    an X-axis beam extending between the Y-axis beams, the X-axis beam disposed on only three bearings configured to provide a three-point support on the Y-axis beams, wherein the X-axis beam is disposed on two bearings on a first Y-axis beam and only a single bearing on a second Y-axis beam, and wherein the single bearing is compliantly mounted between the X-axis beam and the second Y-axis beam such that the single bearing is permitted to move at least in the X-axis direction while providing stiffness in the Z-axis direction; and
    a Z-axis carriage for supporting a probe shaft assembly on the X-axis beam.

2. The CMM of claim 1, wherein the single bearing on the second Y-axis beam is attached to the X-axis beam by a single fastener coupled with a compliant rubber grommet which allows for lateral thermal growth of the X-axis beam versus the base without causing geometrical distortion in the X-axis beam or the base.

3. The CMM of claim 1, wherein the larger dimension of the cross-section of the X-axis beam is approximately horizontal, which provides additional stiffness in the Y-axis direction as the X-axis beam is moved in the Y-direction along the base.

4. The CMM of claim 1, further comprising a combined Z-axis counterbalance and drive means including a counterbalance assembly for counterbalancing the weight of the Z-axis probe shaft assembly, and including a drive assembly for driving the Z-axis probe shaft assembly and the counterbalance assembly with a DC servo motor.

5. The CMM of claim 4, wherein the combined Z-axis counterbalance and drive means includes:
    a flexible cable attached to the probe shaft assembly;
    a spring-powered take-up reel for coiling the cable and for counteracting the weight of the probe shaft assembly; and
    a reversible DC servo motor configured to rotate the take-up reel in accordance with the desired amount of Z-axis movement of the probe shaft assembly.

6. The CMM of claim 1, wherein the Z-axis carriage includes a probe shaft assembly mounting arrangement comprising two bearings on a first rail and a single bearing on a second rail configured to provide a three-point support for the probe shaft assembly, wherein the single bearing on the secondary rail is mounted to the Z-axis carriage via a spring mechanism which provides stiff guidance in the Y-axis direction and compliance in the X-axis direction.

7. The CMM of claim 1, wherein a Y-axis beam includes a Y-axis drive screw, and wherein the CMM further comprises means for coupling the X-axis beam to the Y-axis drive screw such that a variable amount of angular alignment compensation is provided between the X-axis beam and the Y-axis drive screw.

8. The CMM of claim 7, wherein the means for coupling the X-axis beam to the Y-axis drive screw includes a drive nut assembly coupled to the Y-axis drive screw, the drive nut assembly including a mating pair of spherical washers, wherein a first washer has a convex mating surface and a second washer has a concave mating surface.

9. The CMM of claim 1, wherein the Z-axis carriage is disposed on only three bearings configured to provide a three-point support on the X-axis beam.

10. The CMM of claim 1, wherein the X-axis beam is hollow throughout its entire length, and wherein the X-axis beam includes end covers having vents to allow passive flow-through ventilation throughout the hollow X-axis beam.

11. The CMM of claim 1, wherein the base is made of a polymer composite.

12. The CMM of claim 11, wherein the base including its two pillars is casted of a monolithic construction.

13. The CMM of claim 11, wherein the base includes a steel work surface molded into the base to serve as a support surface for a workpiece.

14. The CMM of claim 1, wherein the base is supported on only three elastomeric isolators.

15. A coordinate measuring machine (CMM) comprising:
    a base;
    two Y-axis beams affixed to the base;
    an X-axis beam extending between the Y-axis beams;
    a Z-axis carriage for supporting a probe shaft assembly on the X-axis beam; and
    a combined Z-axis counterbalance and drive means including a counterbalance assembly for counterbalancing the weight of the Z-axis probe shaft assembly, and including a drive assembly for driving the Z-axis probe shaft assembly and the counterbalance assembly with a single motor; wherein the combined Z-axis counterbalance and drive means further includes:
    a flexible cable attached to the probe shaft assembly;
    a spring-powered take-up reel for coiling the cable and for counteracting the weight of the probe shaft assembly; and
    a reversible DC servo motor configured to rotate the take-up reel in accordance with the desired amount of Z-axis movement of the probe shaft assembly.

16. The CMM of claim 15, wherein the Z-axis carriage includes a probe shaft assembly mounting arrangement comprising two bearings on a first rail and a single bearing on a second rail configured to provide a three-point support for the probe shaft assembly, wherein the single bearing on the secondary rail is mounted to the Z-axis carriage via a spring steel flexure which provides stiff guidance in the Y-axis direction and compliance in the X-axis direction.

17. A coordinate measuring machine (CMM) comprising:
    a base;
    two Y-axis beams coupled to the base, one Y-axis beam including a Y-axis drive screw;
    an X-axis beam extending between the Y-axis beams;
    a Z-axis carriage for supporting a probe shaft assembly on the X-axis beam; and
    means for coupling the X-axis beam to the Y-axis drive screw such that a variable amount of angular alignment compensation is provided between the X-axis beam and the Y-axis drive screw.

18. The CMM of claim 17, wherein the means for coupling the X-axis beam to the Y-axis drive screw includes a drive nut assembly coupled to the Y-axis drive screw, the drive nut assembly including a mating pair of spherical washers, wherein a first washer has a convex mating surface and a second washer has a concave mating surface.

19. A coordinate measuring machine (CMM) comprising:

a monolithic gantry-style base constructed of a polymer composite and having two individual pillars;

a Y-axis beam disposed on each pillar, one Y-axis beam including a Y-axis drive screw;

an X-axis beam extending between the Y-axis beams, the X-axis beam disposed on only three bearings configured to provide a three-point support on the Y-axis beams, wherein the X-axis beam is disposed on two bearings on a first Y-axis beam and only a single bearing on a second Y-axis beam, and wherein the single bearing is compliantly mounted between the X-axis beam and the second Y-axis beam such that the single bearing is permitted to move at least in the X-axis direction while providing stiffness in the Z-axis direction;

means for coupling the X-axis beam to the Y-axis drive screw such that a variable amount of angular alignment compensation is provided between the X-axis beam and the Y-axis drive screw;

a Z-axis carriage for supporting a probe shaft assembly on the X-axis beam; and a combined Z-axis counterbalance and drive means including a counterbalance assembly for counterbalancing the weight of the Z-axis probe shaft assembly, and including a drive assembly for driving the Z-axis probe shaft assembly and the counterbalance assembly with a single motor.

20. The CMM of claim 19, wherein the Z-axis carriage includes a probe shaft assembly mounting arrangement comprising two bearings on a first rail and a single bearing on a second rail configured to provide a three-point support for the probe shaft assembly, wherein the single bearing on the secondary rail is mounted to the Z-axis carriage via a spring mechanism which provides stiff guidance in the Y-axis direction and compliance in the X-axis direction.

21. The CMM of claim 19, wherein the larger dimension of the cross-section of the X-axis beam is approximately horizontal, which provides additional stiffness in the Y-axis direction as the X-axis beam is moved in the Y-direction along the base.

* * * * *